United States Patent
Zhang

(12) 
(10) Patent No.: US 6,369,758 B1
(45) Date of Patent: Apr. 9, 2002

(54) ADAPTIVE ANTENNA ARRAY FOR MOBILE COMMUNICATION

(75) Inventor: Deming Zhang, Toronto (CA)

(73) Assignee: Unique Broadband Systems, Inc., Concord (CA)

( * ) Notice: Subject to any disclaimer, the term of this patent is extended or adjusted under 35 U.S.C. 154(b) by 0 days.

(21) Appl. No.: 09/702,606

(22) Filed: Nov. 1, 2000

(51) Int. Cl.⁷ .............................. G01S 3/16; G01S 3/28
(52) U.S. Cl. ...................................... 342/383; 342/378
(58) Field of Search ................................ 342/368, 372, 342/378, 383

(56) References Cited

U.S. PATENT DOCUMENTS

| | | |
|---|---|---|
| 4,752,969 A | 6/1988 | Rilling |
| 5,218,359 A | 6/1993 | Minamisono |
| 5,425,059 A * | 6/1995 | Tsujimoto .................. 375/347 |
| 5,550,872 A | 8/1996 | Liberti, Jr. et al. |
| 5,884,192 A | 3/1999 | Karlsson et al. |
| 5,973,642 A | 10/1999 | Li et al. |
| 5,982,327 A | 11/1999 | Vook et al. |
| 6,006,110 A | 12/1999 | Raleigh |
| 6,018,317 A | 1/2000 | Dogan et al. |
| 6,049,307 A | 4/2000 | Lim |
| 6,081,547 A * | 6/2000 | Miya .......................... 375/130 |
| 6,101,399 A | 8/2000 | Raleigh et al. |
| 6,128,276 A | 10/2000 | Agee |
| 6,167,039 A * | 12/2000 | Karlsson et al. ............ 370/342 |

OTHER PUBLICATIONS

Deming Zhang: CPVL–Algorithmus für eine Adaptive Mobilfunkantenne mit Nur–Phasen–gewichtung; Zeitschrift für Telekommunikation; Band 52; Nov./Dec. 1998; pp. 236–243.

Harald Bochmann et al: FM–Receiver with Adaptive Antenna. SAE Technical Paper Series; Feb./Mar., 1990.

Felix Dobias et al: Reconfigurable array antennas with phase–only control of quantized phase shifters; A Paper from the Department of Communications Engineering, University of Paderborn, Germany; 1995.

Alex. B. Gershman et al: Constrained Hung–Turner Adaptive Beam–Forming Algorithm with Additional Robustness to Wideband and Moving Jammers; IEEE Transactions on Antennas and Propagation, vol. 44, No. 3, Mar. 1996.

R. Vescovo: Pattern Synthesis with null constraints for circular arrays of equally spaced isotropic elements; IEEE Proc.–Microw, Antennas Propag., vol. 143, No. 2, Apr. 1996.

* cited by examiner

*Primary Examiner*—Dao Phan

(57) ABSTRACT

Pseudo random training symbols and/or a constant modulus pilot carrier in OFDM symbols are used to train an adaptive antenna array to cancel unwanted multipath signals and suppress interfering signals. Power variance and power level measurements taken from a plurality of antenna branches during the training symbols and/or the constant modulus pilot carrier are used to determine appropriate weights to be applied to each antenna branch.

25 Claims, 4 Drawing Sheets

ADAPTIVE ANTENNA ARRAY FOR MOBILE COMMUNICATION

BACKGROUND OF THE INVENTION

This invention relates to an adaptive antenna array for mobile communications, and in particular to an adaptive antenna array for use in a mobile receiver in a multipath environment.

Multipath propagation can severely distort the frequency response of a communications channel, especially in a dynamic environment. Multicarrier wireless transmission systems employing orthogonal frequency division multiplexing (OFDM) modulation have become attractive due to their high spectral efficiency and resistance to noise and multipath effects. However, in a moving environment, channel characteristics can change quickly, and additionally, the orthogonality of an OFDM signal can be adversely affected by Doppler spread. Rapidly changing channel characteristics and Doppler spread are prominent problems that limit data transmission speed in a mobile environment.

An adaptive antenna array includes an array of antenna elements connected to a communications receiver and operates by combining the signals received by the antenna elements to adaptively optimize the receive characteristics of the array. By weighting and then summing the multiple antenna signals, the adaptive antenna array can adapt its array pattern to changes in the propagation environment. The adaptive antenna array adjusts the directivity of the antenna adaptively so that the antenna receives the most preferable signal among a plurality of signals that reach the antenna, thereby avoiding the effects of multipath propagation from the same source and noise interference from undesired sources. In a mobile transmission environment, the interference suppression capability of an adaptive antenna array offers the potential to reduce co-channel interference, improve coverage quality, and increase overall system capacity.

Signal processing algorithms for mobile antennas arrays can generally be divided into two major classes, namely time domain algorithms and frequency domain algorithms. An example of a frequency domain algorithm for use in an OFDM system is shown in U.S. Pat. No. 5,973,642 issued Oct. 26, 1999 to Li et al. One drawback with frequency domain algorithms is that they require an FFT engine for each of the separate antennas, which can be cost prohibitive if the adaptive antenna array is to be located in low cost mobile receivers. A time-domain algorithm in an OFDM receiver can be more cost effective as it does not require a full FFT engine for each antenna as the combining is performed prior to transforming the received signals into the frequency domain.

A number of patents and publications have suggested various time domain algorithms for determining the weighting to be applied to signals received by the antenna elements of an adaptive antenna array. However, most of the previously suggested algorithms have been directed towards canceling co-channel interference, rather than eliminating multipath interference and Doppler spread resulting from multipath propagation.

In an article entitled "CPVL-Algorithm for Phase-only Weighted Adaptive Mobile Radio Antenna", Journal of Telecommunications, November/December 1998, the inventor of the present invention proposed an algorithm for a phase only weighted array that efficiently overcomes non-coherent multipath propagation. The CPVL algorithm is also valid for adaptive antenna arrays that use complex weight factors. However, like other time-domain systems, such system fails to perform adequately in coherent multipath conditions, which is disadvantageous given that even in a mobile environment frequently the transmitter and receiver will both be stationary, which may result in a substantially coherent multipath conditions.

In view of the forgoing, there is a need for an efficient, time-domain based adaptive antenna array which can be used with an OFDM receiver for both coherent and non-coherent multipath reception, and which is cost-effective to implement. There is a need for a mobile adaptive antenna array that can efficiently cancel unwanted multipath signals and also suppress interfering signals (such as co-channel interference) at the same time. It is also desirable to have an adaptive antenna array for which explicit knowledge of the array geometry and calibration of the array is not required.

BRIEF SUMMARY OF THE INVENTION

In accordance with the present invention, pseudo random training symbols and/or a constant modulus pilot carrier in OFDM symbols are used to train an adaptive antenna array to cancel unwanted multipath signals and suppress interfering signals. Power variance and power level measurements taken from a plurality of antenna branches during the training symbols and/or constant modulus pilot carrier in OFDM symbols are used to determine appropriate weights to be applied to each antenna branch.

According to one aspect of the invention, there is provided a method for combining a plurality of antenna output signals, each antenna output signal being received from one of a plurality of branches fed from a corresponding plurality of antennas, each radio signal comprising a frame including a pseudo random training symbol and at least one data symbol. The method includes (a) determining a weighting factor for each branch, the weighting factor being determined from power characteristics of the pseudo random training symbol; and (b) combining the antenna output signals from each branch in accordance with the determined weighting factors to form a combined signal. The data symbol may be a multicarrier modulated symbol such as an Orthogonal Frequency Division Modulated (OFDM) symbol. Preferably, the weighting factor for each branch is determined from an average power and power variance determined from the pseudo random training symbol.

According to another aspect of the invention, there is provided a radio frequency receiver including an antenna array device for combining signals received by a plurality of antennas in a communications system where the antennas receive data signals that include a pseudo random training symbol and at least one data symbol. The antenna array device comprises (a) an array controller, arranged to receive the data signals from each of the antennas, for determining a weighting factor for each antenna based on power characteristics of the pseudo random training symbol; (b) a weighting device coupled to each antenna for weighting the data signal received by each antenna according to the weight factor determined for each antenna; and (c) a combiner for receiving and combining the weighted data signals to form a combined data signal. Preferably the array controller determines the weighting factor for each antenna based on an average power and power variance determined from the pseudo random training symbol.

According to a further aspect of the invention, there is provided a method for steering an adaptive antenna array that includes a plurality of antennas in a communications system where the antennas receive and output data signals that include a training symbol and at least one data symbol, the training symbol including a first pseudo random subsymbol and a second subsymbol that is a copy of the first subsymbol. The method includes (a) separating training symbol information from interfering noise signal information based on autocorrelation properties of the training symbol; (b) determining a weighting factor for the signals received by each antenna, the weighting factor being determined from power characteristics of the separated training signal information; and (c) combining the signals from each antenna in accordance with the determined weighting factors to form a combined signal. Preferably, the output data signals include a null symbol, the method including a step of measuring interfering signal characteristics during the null symbol and, based on the interfering signal characteristics, selecting which of a plurality of predetermined algorithms to use to determine the weighting factor for signals received by each antenna.

According to still a further aspect of the invention, there is provided a method for combining a plurality of antenna output signals, each antenna output signal being received from one of a plurality of branches fed from a corresponding plurality of antennas, each radio signal comprising a plurality of OFDM symbols including a constant modulus pilot carrier. The method includes (a) determining a weighting factor for each branch, the weighting factor being determined from power characteristics of the constant modulus pilot carrier; and (b) combining the antenna output signals from each branch in accordance with the determined weighting factors to form a combined signal.

BRIEF DESCRIPTION OF THE DRAWINGS

Preferred embodiments of the method and apparatus of the present invention will now be described with reference to the following drawings.

DETAILED DESCRIPTION OF THE INVENTION

Figure 1:
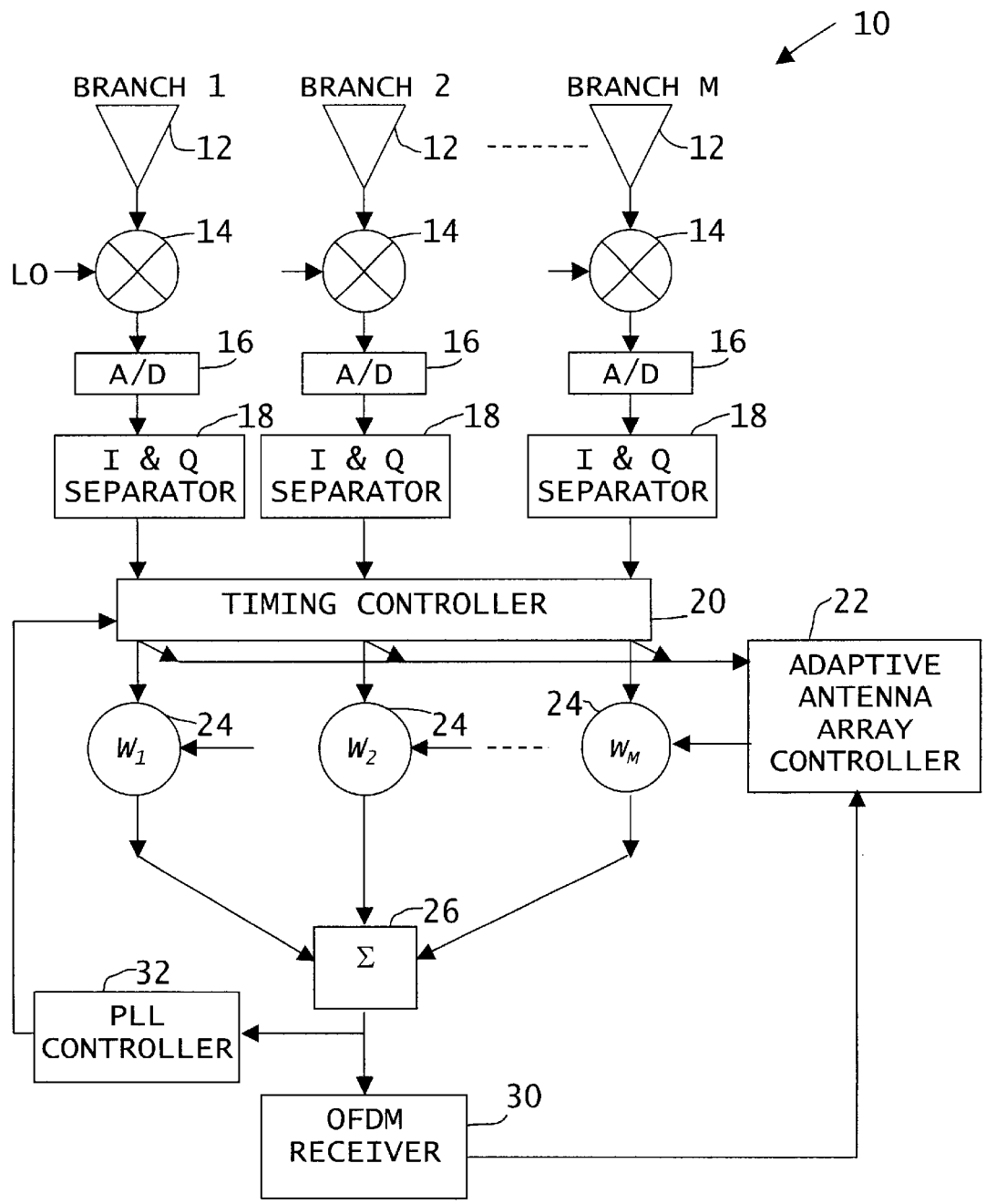
FIG. 1 is a block diagram of an adaptive antenna array in accordance with a preferred embodiment of the present invention.

FIG. 1 is a block diagram showing an adaptive antenna array, indicated generally by numeral 10, of a mobile receiver in accordance with a preferred embodiment of the present invention. The adaptive antenna array 10 includes a plurality of antennas 12, each of which is connected to a processing branch that includes a downconverter 14, analog to digital converter 16, complex separator 18, and a complex weighting device 24. The adaptive array antenna 10 also includes a timing controller 20, an adaptive antenna array controller 22, and a combiner 26. The downconverters 14, which may consist of radio frequency pre-amplifiers, filters, demodulators and other conventional devices, each demodulate the signals from their respective antennas 12 to produce substantially baseband signals. The analog to digital converters 16 convert the baseband signals in each branch from analog signals to sampled digital signals. The complex separators 18 separate the real (in-phase) and imaginary (quadrature) parts of the digitized signals. The complex signal components from each of the antennas are provided, by means of the timing controller 20, to the adaptive antenna array controller 22, and to the complex weighting devices 24. The adaptive antenna array controller 22, using an array control methodology that will be discussed in greater detail below, determines appropriate complex weighting to be applied to the output of each of the antennas 12. The complex weighting devices 24 multiply the complex signal components obtained from each of the antennas 12 by the complex weights calculated by the controller 22. The outputs of the weighting devises 24 are summed in a combiner 26, and the output of the combiner 26 is provided to a main receiver device 30, which in one preferred embodiment is an OFDM receiver. A phase locked loop controller 32 controls timing controller 20.

The timing controller 20 includes M complex data buffers (one complex data buffer for each of the M antenna branches) with a timing pointer that points to the beginning of an current OFDM or training symbol and that is controlled by the phase locked loop controller 32 (PLL), enabling a precise symbol by symbol output of the timing controller 20. Using methods known in the art, the phase locked loop controller 32 checks the timing error and makes a proper adjustment on the timing controller 20 (timing pointer).

Figure 2:
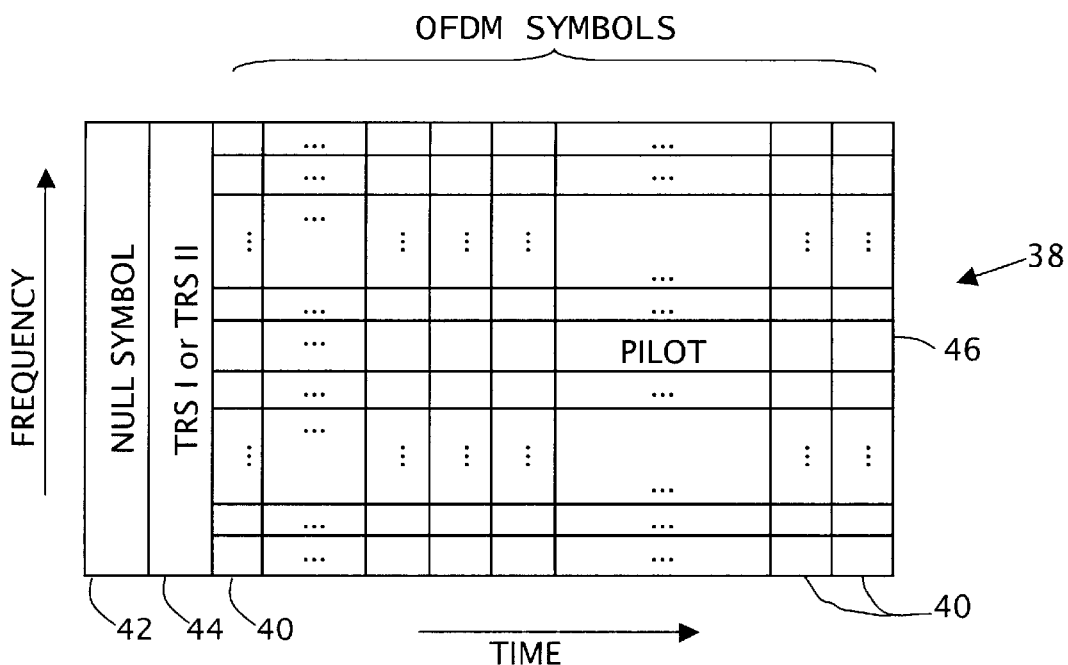
FIG. 2 shows a frame structure of a transmission frame received by the adaptive antenna array of FIG. 1.

Transmissions in accordance with the present invention comprise successively transmitted frames. A preferred transmission frame format, indicated by numeral 38, is shown in FIG. 2. Each frame 38 includes a number of consecutively transmitted symbols, including a preamble that includes a null symbol 42 and one of two possible adaptive antenna array training symbols (TRS I or TRS II) 44. The preamble is followed by a predetermined number of OFDM symbols 40. Each OFDM symbol includes a plurality of modulated subcarriers. Preferably, one of the OFDM subcarriers is a pilot carrier 46 modulated with constant modulus signals (such as QPSK) during the duration of the OFDM portion of frame 38.

Figure 5:
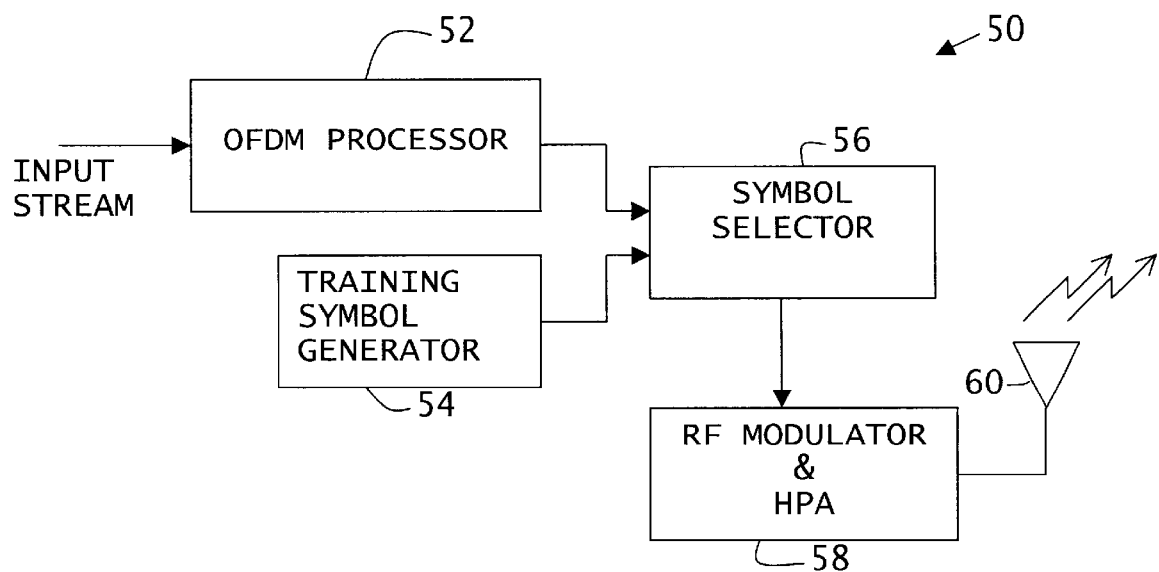
FIG. 5 is a block diagram of an OFDM transmitter in accordance with the present invention.

FIG. 5 illustrates a block diagram of an exemplary transmitter 50 which can be used to transmit frames 38. The transmitter 50 includes an OFDM processor 52 that includes the components typically found in a OFDM signal generator, for example, inter alia, an error correction coder, constellation mapper, pilot inserter, an IFFT and a guard interval inserter. The OFDM processor 52 takes an input bit stream and generates the OFDM signal portion of frame 38. The transmitter 50 includes a training symbol generator 54 for selectively generating Training Symbols TRS I and TRS II. The outputs of the OFDM processor 52 and training symbol generator 54 are provided to a symbol selector 56 which inserts training symbols generated by training symbol generator 54 into the train of OFDM symbols at the appropriate time slots to produce successive frames 38. Conventional front end equipment, including an RF modulator and high power transmit amplifier 58, and a transmit antenna 60, transmit the frames 38 received from selector 56.

Overview of Optimization Algorithm

The adaptive antenna array 10 of the present invention uses an optimization algorithm to adaptively determine the appropriate weights to be applied to the signals received by the $1^{st}$ through $M^{th}$ antennas 12. In particular, the adaptive antenna array controller 22 is configured to apply weightings that will cause the antenna array to steer towards one desired signal path, and suppress unwanted multipath signals and interfering signals. The array controller 22 does this by searching for and selecting weightings that result in a desired signal having an optimal combination of high average power and low variance in power. Thus, the adaptive antenna array seeks to maintain a flat channel response in the mobile transmission environment. As will be explained in greater detail below, the selected weightings depend on the results of calculations performed on one or more of the training symbol 44, null symbol 42, and a pilot 46 transmitted on a selected OFDM sub-carrier. The null symbol 42 is a symbol that has no signal power at the beginning of the frame 38, thus allowing the adaptive antenna array to distinguish the null symbol from the other symbols and measure interference characteristics of the channel.

Prior to describing the specific calculations performed by the adaptive antenna array controller 22, an overview of the optimization theory employed by the array is useful. The adaptive antenna array uses an algorithm that preferably employs a cost function to determine the weightings to be applied to each of the antenna signals. A number of different cost functions can be used to determine what particular antenna branch weightings will result in a signal having an appropriate combination of high average power and low variance, however three preferred possible cost functions are as follows.

Preferred Cost Function 1

$$F_1(W)\bigg|_{\|W\|=1} = \sigma_p^2/p_0^2 + \mu_0 \cdot \overline{p_n^2}/p_0^2 - \mu_1 \cdot \overline{p^2}/p_0^2 + \mu_2 \cdot \overline{p_n^2}/p_0^2 \rightarrow \min \quad (1)$$

Preferred Cost Function 2

$$F_2(W)\bigg|_{\|W\|=1} = \frac{\sigma_p^2/p_0^2 + \mu_0 \cdot \overline{p_n^2}/p_0^2}{\overline{p}/p_0} - \mu_1 \cdot \overline{p}/p_0 + \mu_2 \cdot \overline{p_n}/p_0 \rightarrow \min \quad (2)$$

Preferred Cost Function 3

$$F_3(W)\bigg|_{\|W\|=1} = \frac{\overline{p^2}/p_0^2 + \mu_0 \cdot \overline{p_n^2}/p_0^2}{\overline{p^2}/p_0^2} \rightarrow \min \quad (3)$$

Where:
W is the weight vector;
p is signal power;
$\sigma_p^2$ is the power variance;
$p_n$ is the power of interference measured during the null symbol; and
$\mu_0$, $\mu_1$ and $\mu_2$ are weight factors.
$p_0$ is a normalization factor that is related to the average signal power received.
The factor $p_0$ will be defined later.

As used in the above three cost function equations, the operator $(\overline{\bullet})$ is a simplified note for the operator of expectation $E\{\bullet\}$ or average operation. For example:

$$\overline{p_n} = E\{p_n\} = E\{|y_n(t)|^2\}; \quad (4)$$

$$\overline{p_n^2} = E\{p_n^2\} = E\{|y_n(t)|^4\}; \quad (5)$$

$$y_n(t) = W^H X_n(t); \quad (6)$$

$$X_n(t) = [x_1(t), x_2(t), \ldots, x_M(t)]^T, t \in \text{Null Symbol}. \quad (7)$$

Where:
$y_n(t)$ is the array output during the interval of null symbol 42;
$X_n(t)$ is the vector consisting of the outputs of all antenna elements;
M is the number of antenna elements; and
$W^H$ is the Hermitian conjugate transpose of the weight vector W.

As discussed below, the definitions of p and $\sigma_p^2$ depend on the training symbols used by the adaptive antenna array 10.

In order to control the dynamic range of the values resulting from the cost function that is used, the cost function should be normalized by a factor $p_0$ that is related to the average signal power received.

The optimal weight vector $W_{opt}$ for the complex weighting device 24 in the adaptive antenna array 10 is obtained by solving the cost function (1) or (2) or (3):

$$W_{opt} = \underset{W}{\operatorname{argmin}} \, F_i(W), \quad i = 1 \text{ or } 2 \text{ or } 3 \quad (8)$$
$$\|W\|=1$$

A number of well known optimization techniques can be used for solving equation (8), however the multi-minimum problem should be accounted for. That is, for any given transmission environment, the solution curves for the above cost functions will probably have multiple troughs (ie. local minimums), each corresponding to a possible choice of antenna weightings for the adaptive antenna array to use to cancel multipath by selecting only one of several available paths. However, at any given time, one local minimum will generally have a value that is lower than the other local minimums, and it is this main minimum that corresponds to the optimal choice of antenna weightings. In a dynamic environment some local minimums will gradually disappear, some new minimums will gradually emerge, some will increase and some will decrease. The antenna controller 22 preferably is configured to search out a reasonable number of local minimums, and continuously track (update) them. For an adaptive antenna array with M antenna elements, the number of tracked local minimums is preferably not less than M.

Overview of Training Symbols

As noted above, the optimization algorithm depends on calculations performed on one or more of the null symbol, training symbols TRS I or TRS II, or pilot carrier in the OFDM symbol portion of the frame 38. In coherent multipath condition, or if both the receiving adaptive antenna array and the transmission antenna as well as any reflecting bodies in the environment are at a standstill, multipath signals from the same source (with the exception of white noise) are coherent, and prior time domain adaptive antenna array algorithms will normally fail to work properly. According to the present invention, training symbols are therefore designed for the adaptive antenna array to avoid multipath coherency. Because white noise is always non-coherent in multipath propagation conditions, pseudo wide band random noise is a proper choice for designing the training symbols TRS I or TRS II. Special signal patterns for the training symbol, e.g. cyclic prefix, repeated subsymbols, or other patterns, can be designed in the training symbols to enable the adaptive antenna array to distinguish between desired signals and interference signals. The spectrum of the training symbols should be as wide as possible, but not wider than the assigned channel bandwidth. This is the basic principle for designing training symbols in accordance with the preferred embodiment of the invention.

The selective use of one of two possible training symbols (TRS I or TRS II) in the transmission frame 38 permits the adaptive antenna array to work even in coherent multipath situations when both the transmit and receive antennas as well as the reflecting bodies in the environment are stationary. In the following sections, the nature of the training symbols and pilot carrier in the OFDM symbols and the specific calculations performed by the adaptive antenna array controller 22 in respect of such symbols will be described in detail.

Training Symbol TRS I

Figure 3:
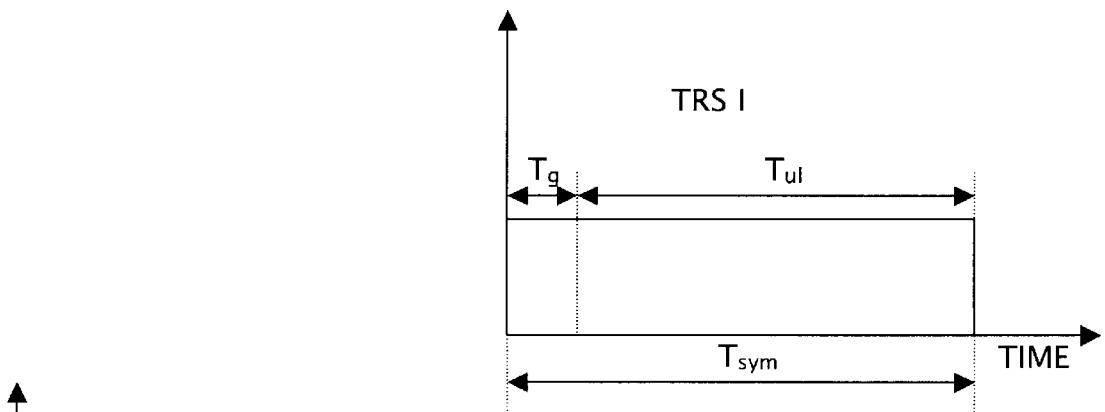
FIG. 3 shows the envelope of a preferred training symbol.

FIG. 3 shows the envelope and structure of the training symbol TRS I. The training symbol TRS I has a total symbol duration of $T_{sym}$, including a useful portion having an interval of $T_{ul}$ and a cyclic prefix guard portion having a interval of $T_g$. The useful portion of the TRS I symbol duration is preferably consistent with that of the OFDM symbols 40 (ie. $T_{ul}$=inverse of OFDM subcarrier spacing). The base band analytic expression for the useful interval of TRS I can be represented as follows:

$$s_{TRSI}(t) = A_{TRSI} e^{jP(t)}, \quad t \in T_{ul} \quad (9)$$

Where:

P(t) is a pseudo random phase function;

$A_{TRSI}$ is an amplitude; and $T_{ul}$ is the useful symbol interval of TRS I.

The pseudo random phase function P(t) is defined in more detail in the following equations:

$$\begin{cases} |P(t_{n+1}) - P(t_n)| \leq \pi \\ P(t) = P(t_n) + \dfrac{P(t_{n+1}) - P(t_n)}{T_{samp}}(t - t_n), \quad t \in [t_n, t_{n+1}] \end{cases} \quad (10)$$

Where:

P(t) are pseudo random samples;

the sample interval $T_{samp} = t_{n+1} - t_n = 1/B$; and

B is the bandwidth of the entire OFDM symbol (ie. total bandwidth of all subcarries together).

The amplitude $A_{TRSI}$ should preferably be so chosen that the power of TRS I is equal to the average power of the OFDM symbols 40 transmitted in frame 38. The training symbol TRS I, as defined above, has sufficient bandwidth. To ensure the that the bandwidth of TRS I does not exceed the assigned channel bandwidth, appropriate pre-transmission filtering can be applied to TRS I.

The training symbol TRS I permits the adaptive antenna array 10 to operate efficiently regardless of whether the antenna array is moving or not. Multipath coherency is avoided as a result of the rapidly varying nature of the training symbol TRS I during the duration $T_{sym}$, allowing the adaptive antenna array to distinguish between a preferred path and unwanted multipath signals from the same source. Equation (10) is only one many possible definitions for P(t). Several other definitions of P(t) are possible so long as they result in psuedo random training symbols, thereby satisfying the basic principle for design of the training symbol noted above.

When using TRS I as a training symbol, the signal power p and power variance $\sigma^2_p$ are defined according to the following equations:

$$p = |y(t)|^2 \quad (11)$$

$$\sigma_p^2 = \overline{(p-\bar{p})^2} = \overline{p^2} - \bar{p}^2 \quad (12)$$

$$y(t) = W^H X(t) \quad (13)$$

$$X(t) = [x_1(t), x_2(t), \ldots, x_M(t)]^T, \quad t \in TRS \ I. \quad (14)$$

Where:

y(t) is the array output during the interval of TRS I;

X(t) is a vector consisting of the outputs of all antenna elements; and

M is the number of antenna elements.

In the case of training symbol TRS I, the normalization factor $p_0$ is calculated as follows:

$$p_0 = \frac{\sum_{i=1}^{M} \overline{|x_i(t)|^2}}{M}, \quad t \in TRS \ I \quad (15)$$

For training symbol TRS I the weight factors $\mu_0$ and $\mu_2$ in the cost function equations should be chosen as 0, because it is assumed there is no continuing strong interference. Although this removes the term $p_n$ (interference signal power measured during the null symbol duration) from the cost function equations, if interfering signals exist in the transmission environment interference information is inherently included in $\bar{p}$ and $\sigma_p^2$ as interfering signals and are treated as one or more paths of a normal multipath signal.

Accordingly, if the interfering signal is too strong, it will attract the array beam, which is a drawback of TRS I and is why additional correlation processing as described below is preferred when ongoing interfering signals exist. The value of the weight factor $\mu_1$ is preferably chosen to fall within the range 0.01 to 0.1. A smaller weight factor $\mu_1$ means that the power variance $\sigma_p^2$ will play a larger factor than the power level $\bar{p}$ so that a smoother output with smaller power variance $\sigma_p^2$ will be achieved. Conversely, a larger weight factor $\mu_1$ will result in an array output with high power level but the residual of multipath cancellation will also be large.

To reduce the possibility of incorrect steering while using training symbol TRS I, the following additional correlation processing steps can be employed by the adaptive antenna array controller 22. Such correlation steps assume that the pseudo random training symbol TRS I is previously known to the adaptive antenna array controller 22. Assuming that the minimal points found through optimization technique are $W_{opt,i}$, i=1, 2, ..., I, where I is the number of minimal points found, one of the following two preferred alternative processing steps can be taken:

(1) Check the correlation coefficients between array outputs and the reference of TRS I:

$$\rho_{sy_i} = \frac{\int_0^{T_{sym}} y_i(t) s^*_{TRSI}(t) dt}{\left(\int_0^{T_{sym}} |y_i(t)|^2 dt \cdot \int_0^{T_{sym}} |s_{TRSI}(t)|^2 dt\right)^{1/2}} \quad (16)$$

With array outputs:

$$y_i(t) = W_{opt,i}^H X(t) \quad (17)$$

Where t=0 is the receive start time for symbol TRS I. Then the final optimal weight vector can be calculated:

$$W_{opt} = \underset{i}{\mathrm{argmin}} \ (F(W_{opt,i}) + 1/|\rho_{sy_i}|) \quad (18)$$

One drawback of this first alternative processing step is that the shortest path of the desired signal has a greater probability of being chosen over other longer paths, even though the shortest path may not be the optimal choice. This is because of the following property of training symbol TRS I (pseudo wide band random signal):

$$\int_0^{T_{sym}} s_{TRSI}(t+\delta)s^*_{TRSI}(t)dt \approx 0, \quad \text{if } \delta \geq T_{samp} \tag{19}$$

Thus, an alternative processing step is:
(2) Check the correlation coefficients between the cyclic prefix of array outputs $$\rho^{(l)}_{y_i y_i} = \frac{\frac{1}{T_g}\int_0^{T_g} y_i(t)y^*_i(t+T_{ul})dt}{\frac{1}{T_{sym}}\int_0^{T_{sym}}|y_i(t)|^2 dt} \tag{20}$$

Then the final optimal weight vector can be calculated:

$$W_{opt} = \arg\min_i (F(W_{opt,i}) + 1/|\rho^{(l)}_{y_i y_i}|) \tag{21}$$

This second alternative will generally provide better performance than the first alternative above. It should be noted, however that under this second alternative, signals from the paths with the largest propagation delays may be considered less than signals with shorter delays. However, as the signals with the largest delays normally have smaller amplitudes, all paths will be estimated although the correlation coefficients will be affected by the delay roughly shown below $$\rho^{(l)}_{y_i y_i} \approx 1 - \frac{\delta_i}{T_g} \tag{22}$$

Where $\delta_i$ is the path delay of the array output with the weight vector $W_{opt,i}$.

Through the additional correlation processing noted above, the possibility of incorrect steering which using training symbol TRS I will be reduced. However, the drawback of using training symbol TRS I, as mentioned above, is that in the event that there is a continuous and strong source of interference in the same band in the transmission environment (for example, intentional or unintentional jamming, or strong co-channel interference), the adaptive antenna array could confuse the interfering transmission with the desired signal equally, with the result that the adaptive antenna array will steer to the direction of the interfering transmission, if the additional correlation processing is not applied. Furthermore, the correlations (16) and (20) can not give an even estimation for all paths with different delays. In particular, although the fact that the training symbol TRS I is a pseudo wide band random noise allows the adaptive antenna array to distinguish between multipath signals from the same source, it may be difficult for the adaptive antenna array to distinguish the training symbol TRS I from an unknown interfering signal from a different source as the symbol TRS I has no special distinguishing characteristics, other than its cyclic prefix. Although this drawback can be somewhat compensated for by using one of the two correlation processing steps noted above, better steering performance can be provided by using a different training symbol TRS II when strong interfering signals exist. Nonetheless, if the adaptive antenna array is unlikely to be used in an environment where strong, continuous interfering transmissions in the same band exist, the use of training symbol TRS I is preferred due to its simplicity and efficiency.

Training Symbol TRS II

Figure 4:
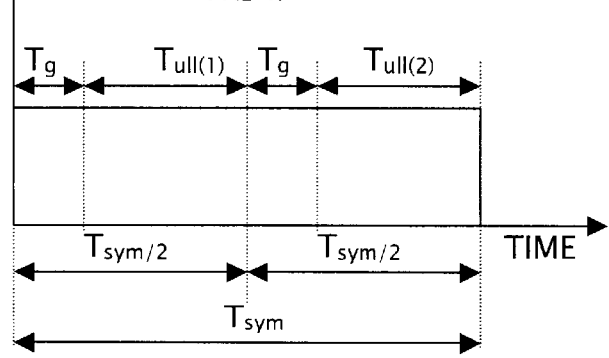
FIG. 4 shows the envelope of a further preferred training symbol.

A different training symbol TRS II can be used if the adaptive antenna array 10 is to be subjected to strong, continuous interfering transmissions. The envelope and structure of the TRS II is shown in FIG. 4. The training symbol TRS II actually includes two identical sub-symbols, having a combined total duration of $T_{sym}$. Each sub-symbol has a duration of $T_{sym/2}$, where $T_{sym/2}$, each sub-symbol duration including a useful portion interval of $T_{uII(1)}$ and $T_{uII(2)}$, respectively ($T_{uII(1)} = T_{uII(2)}$) and a cyclic prefix guard interval of $T_g$. The base band analytic expression for the useful interval of each of the sub-symbols of TRS II can be represented as follows:

$$s_{TRSII}(t) = A_{TRSII}e^{jP(t)}, \quad t \in T_{uII(2)} \tag{23}$$

Where:
  P(t) is a pseudo random phase function as defined above; and
  $A_{TRSII}$ is the amplitude;
  $T_{uII(2)}$ is the useful symbol interval of the sub-symbol.
  $A_{TRSII}$ is preferably chosen so that the power of training symbol TRS II is equal to the average power of the OFDM symbols in the frame 38.

Similar to TRS I, the training symbol TRS II defined above has sufficient bandwidth. To ensure the bandwidth does not exceed the assigned channel bandwidth, appropriate pre-transmission filtering can be applied to TRS II.

The use of a training symbol TRS II having two identical sub-symbols permits the adaptive antenna array to use correlation techniques to distinguish between a desired signal and an interfering jamming signal because training symbol TRSII has better correlation properties than training symbol TRS I. The training symbol need not be limited to two identical portions, but can include more than two identical portions, so long as correlation within the symbol duration is possible. When the training symbol TRSII is used, the adaptive antenna array preferably selects one of three working modes (which will be referred to as Mode I, Mode II and Mode III) depending upon whether the interfering signals received by the adaptive antenna array are narrowband or wideband. If the interfering signals are limited to a single frequency or a narrow range of frequencies within the assigned channel bandwidth, then the adaptive antenna preferably operates in Mode I. In Mode I, the training symbol TRS II alone can be used to make the adaptive antenna array blind to the interfering signals and focus on one path of the useful signal and generate nulls to cancel or suppress the other paths from the same source (but maybe from different transmitters). However, if the interfering signals are strong wideband or co-channel interference, then additional signal processing is desirable. In particular, in addition to measurements made in respect of the training symbol TRS II, in Mode II the adaptive antenna array relies on characteristics measured during reception of the null symbol 42, or alternatively, in Mode III, the adaptive antenna array relies on additional correlation processing.

The adaptive antenna array can preferably switch between Mode I, Mode II and Mode III adaptively by checking and tracking the interference properties in null symbol interval over a number of transmitted frames 38. In this regard, the adaptive antenna array controller 22 is preferably connected to the OFDM receiver 30 to receive the output of the FFT from the OFDM receiver. By analyzing the FFT output during successive null symbols, the array controller 22 can determine if interference exists, the properties (such as bandwidth and amplitude) of such interference, and whether the interference is continuous. Further details of the three operating modes under training symbol TRSII will now be provided.

Training Symbol TRS II—Mode I

When using the training symbol TRS II in Mode I, desired signals and interfering signals can be estimated separately. The weight factors $\mu_0$ and $\mu_2$ should be chosen as 0, so that the adaptive antenna array does not take interference into account when calculating the cost function. Accordingly, in Mode I, the adaptive antenna array functions primarily to cancel unwanted multipath signals from the same source. The value of weight factor $\mu_1$ is chosen from 0.01 to 0.1. For TRS II, the signal power and power variance are defined as:

$$p = y(t)y^*(t-T) \quad (24)$$

$$\sigma_p^2 = \overline{(p-\bar{p})^2} = \overline{p^2} - \bar{p}^2 \quad (12)$$

$$y(t) = W^H X(t) \quad (13)$$

$$X(t) = [x_1(t), x_2(t), \ldots, x_M(t)]^T, \; t \in T_{uII(2)} \quad (25)$$

$$T = T_{sym}/2 \quad (26)$$

As $\bar{p}$ and $\overline{p^2}$ are no longer real values, Cost Function 1, Cost Function 2 and Cost Function 3 should be modified as follows:

Cost Function 1: (27)

$$F_1(W) \underset{\|W\|=1}{=} \mathrm{Re}(\sigma_p^2/p_0^2) - \mu_1 \cdot \mathrm{Re}\left(\overline{p^2}/p_0^2\right) \to \min$$

Cost Function 2: (28)

$$F_2(W) \underset{\|W\|=1}{=} \frac{\mathrm{Re}(\sigma_p^2/p_0^2)}{\mathrm{Re}(\bar{p}/p_0)} - \mu_1 \cdot \mathrm{Re}\left(\bar{p}/p_0\right) \to \min$$

Cost Function 3: (29)

$$F_3(W) \underset{\|W\|=1}{=} \frac{\mathrm{Re}\left(\overline{p^2}/p_0^2\right)}{\mathrm{Re}\left(\overline{p^2}/p_0^2\right)} \to \min$$

Where $p_0$ is the normalization factor related to the average signal power received and is calculated as follows:

$$p_0 = \frac{\sum_{i=1}^{M} \overline{x_i(t) x_i^*(t-T)}}{M}, \; t \in T_{uII(2)} \quad (30)$$

As TRS II has good correlation properties due to its repeated sub symbols, only desired signal information, without information of interference signals (with the exception of calculation errors), will be included in equations (27), (28) and (29). The following proof of this statement is offered:

Assume $y(t) = s(t) + n(t)$ and note $s(t-T) = s(t)e^{-j\Delta\omega T}$, $t \in T_{uII(2)}$, where $\Delta\omega$ is the residual offset of the RF carrier; $s(t)$ is the TRS II signal and $n(t)$ is interference.

Then:

$$\begin{aligned}\bar{p} &= \overline{y(t)y^*(t-T)} \quad (31)\\ &= \overline{[s(t)+n(t)][s(t-T)+n(t-T)]^*}\\ &= \overline{s(t)s(t-T)^* + s(t)n(t-T)^* + n(t)s(t-T)^* + n(t)n(t-T)^*}\\ &= \overline{s(t)s(t-T)^*}\\ &= |s(t)|^2 \cdot e^{j\Delta\omega T}\end{aligned}$$

and $$\overline{p^2} = \overline{[y(t)y^*(t-T)]^2} = \overline{[s(t)+n(t)]^2[s^*(t-T)+n^*(t-T)]^2} = |s(t)|^4 \cdot e^{j2\Delta\omega T}. \quad (32)$$

Therefore the adaptive antenna array will fully ignore the interference directions and concentrate its attention on cancellation of unwanted multipath signals.

Training Symbol TRS II—Mode II

In Mode II, unwanted multipath signals and interference are suppressed at the same time. The values of the weighting coefficients $\mu_0$ and $\mu_2$ are no longer zero, resulting in the following alternative Cost Function equations:

Cost Function 1: (33)

$$F_1(W) \underset{\|W\|=1}{=} \mathrm{Re}(\sigma_p^2/p_0^2) + \mu_0 \cdot \overline{p_n^2}/(p_0 p_0^*) -$$
$$\mu_1 \cdot \mathrm{Re}\left(\overline{p^2}/p_0^2\right) + \mu_2 \cdot \overline{p_n^2}/(p_0 p_0^*) \to \min$$

Cost Function 2: (34)

$$F_2(W) \underset{\|W\|=1}{=} \frac{\mathrm{Re}(\sigma_p^2/p_0^2) + \mu_0 \cdot \overline{p_n^2}/(p_0 p_0^*)}{\mathrm{Re}(\bar{p}/p_0)} -$$
$$\mu_1 \cdot \mathrm{Re}\left(\bar{p}/p_0\right) + \mu_2 \cdot \overline{p_n}/|p_0| \to \min.$$

Cost Function 3: (35)

$$F_3(W) \underset{\|W\|=1}{=} \frac{\mathrm{Re}\left(\overline{p^2}/p_0^2\right) + \mu_0 \cdot \overline{p_n^2}/(p_0 p_0^*)}{\mathrm{Re}\left(\overline{p^2}/p_0^2\right)} \to \min$$

Multipath signals are taken into account by $\bar{p}$ and $\overline{p^2}$, and interference is taken into account through $\overline{p_n}$ and $\overline{p_n^2}$ (power measurements taken during the null symbol). Preferably, the value of $\mu_0$ is in the range of 1 to 4, $\mu_1$ in the range of 0.01 to 0.1 and $\mu_2$ in the range of 0.3 to 2. Smaller values of $\mu_0$ and $\mu_2$ tend not to result in adequate suppression of interference, while bigger values tend to result in poor multipath cancellation.

A modification of $\overline{p^2}$ can be used to further simplify the Cost Functions 1, 2 and 3. Again assuming $y(t) = s(t) + n(t)$, then:

$$\begin{aligned}|p|^2 &= \overline{[y(t)y^*(t-T)][y^*(t)y(t-T)]} \quad (36)\\ &= \overline{[y(t)y^*(t)][y^*(t-T)y(t-T)]}\\ &= \overline{p(t)p^*(t-T)}\\ &= \overline{[s(t)+n(t)][s^*(t)+n^*(t)][s^*(t-T)+n^*(t-T)][s(t-T)+n(t-T)]}\\ &= \overline{[|s(t)|^2 + |n(t)|^2 + 2\mathrm{Re}\{s(t)n^*(t)\}][|s(t)|^2 + |n(t-T)|^2 + 2\mathrm{Re}\{s(t-T)n^*(t-T)\}]}\end{aligned}$$

-continued $$= \overline{|s(t)|^4 + |n(t)|^2|n(t-T)|^2 + |s(t)|^2|n(t-T)|^2 + |n(t)|^2|s(t)|^2}$$

$$= \overline{|s(t)|^4 + |n(t)|^2|n(t-T)|^2 + 2|s(t)|^2 \cdot |n(t)|^2}$$

$$\overline{p} = \overline{y(t)y^*(t-T)} = \overline{[s(t)+n(t)][s(t-T)+n(t-T)]^*} = \overline{|s(t)|^2 \cdot e^{j\Delta\omega T}} \quad (31)$$

It is seen that the signal and interference are combined into $\overline{|p|^2}$, so the cost functions can be modified as:

Cost Function 1: (37)

$$F_1(W)\big|_{\|W\|=1} = \left[\overline{|p|^2} - (1+\mu_1) \cdot |\overline{p}|^2\right] / (p_0 p_0^*) \to \min$$

Cost Function 2: (38)

$$F_2(W)\big|_{\|W\|=1} = \frac{(\overline{|p|^2} - |\overline{p}|^2)/(p_0 p_0^*)}{\operatorname{Re}(\overline{p}/p_0)} - \mu_1 \cdot \operatorname{Re}(\overline{p}/p_0) \to \min$$

Cost Function 3: (39)

$$F_3(W)\big|_{\|W\|=1} = \frac{\overline{|p|^2}/(p_0 p_0^*)}{\operatorname{Re}(\overline{p}^2/p_0^2)} \to \min$$

The cost functions (37), (38) and (39) work very similarly to functions (33), (34) and (35) except that the couple term $$2\overline{|s(t)|^2 \cdot |n(t)|^2} \text{ in } \overline{|p|^2}$$

can potentially degrade the performance if equation (37) is used, and that the level of the components $\overline{p_n^2}$ and $\overline{p_n}$ can not be freely controlled by proper weighting coefficients, as is seen in equation (36).

Training Symbol TRS II—Mode III

The algorithm for Training Symbol II—Mode III is similar to the algorithm used in respect of training symbol TRS I.

$$p=|y(t)|^2 \quad (11)$$

$$\sigma_p^2 = \overline{(p-\overline{p})^2} = \overline{p^2} - \overline{p}^2 \quad (12)$$

$$y(t)=W^H X(t) \quad (13)$$

$$X(t)=[x_1(t), x_2(t), \ldots, x_M(t)]^T, t \in \text{TRS II.} \quad (40)$$

$$p_0 = \frac{\sum_{i=1}^{M} \overline{|x_i(t)|^2}}{M}, \quad t \in \text{TRS II.} \quad (41)$$

The cost functions are the same as those employed in respect of training symbol TRS I, namely:

Cost Function 1: (42)

$$F_1(W)\big|_{\|W\|=1} = \sigma_p^2/p_0^2 - \mu_1 \cdot \overline{p}^2/p_0^2 \to \min$$

Cost Function 2: (43)

$$F_2(W)\big|_{\|W\|=1} = \frac{\sigma_p^2}{\overline{p} \cdot p_0} - \mu_1 \cdot \overline{p}/p_0 \to \min$$

-continued

Cost Function 3: (44)

$$F_3(W)\big|_{\|W\|=1} = \frac{\sigma_p^2/p_0^2}{\overline{p}^2/p_0^2} \Longrightarrow \frac{\overline{p}^2/p_0^2}{\overline{p}^2/p_0^2} \to \min$$

When operating in Mode 3, the adaptive antenna array controller 22 uses the equation (8) to find a number of minimum points $W_{opt,i}$, i=1, 2, . . . , I, where I is the number of minimum points found. Then, in what is a difference from the algorithm used in respect of training symbol TRS I, the following equations are used to make a final decision on the optimum weight coefficients $W_{opt}$:

$$W_{opt} = \arg\min_{i} (F(W_{opt,i}) + 1/|\rho_{y_i y_i}^{(II)}|) \quad (45)$$

$$\rho_{y_i y_i}^{(II)} = \frac{\frac{2}{T_{sym}-2T_g} \int_{T_g}^{\frac{T_{sym}}{2}} y_i(t) y_i^*(t+T_{sym}/2) dt}{\frac{1}{T_{sym}-T_g} \int_{T_g}^{T_{sym}} |y_i(t)|^2 dt} \quad (46)$$

With array outputs:

$$y_i(t)=W_{opt,i}^H X(t) \quad (17)$$

The calculations performed under Mode III are not influenced by movement of the antenna array and are not influenced by the delay spread, so long the biggest delay is less than the guard interval $T_g$. Furthermore, in Mode III it is not necessary to use the Null Symbol for estimating interfering characteristics, because all information about the transmission environment is included in the cost functions (42), (43) and (44). Thus, Mode III may provide better performance than TRS I and TRS II Mode II, if signal multipath and interference are both ongoing concerns in the transmission environment. If, however, only multipath signals from a desired source are of concern and signals from interfering sources are minor or negligible, Mode I should provide better performance than Mode III.

Training Using OFDM Symbols

Another possible array antenna training alternative is to use readings taken during the OFDM symbol portion of frame 38 to determine the appropriate weights to be applied to each of the antenna branches. In order to permit OFDM symbols to be used to steer the adaptive antenna, one of the OFDM subcarriers is used as a pilot carrier 46. The adaptive antenna array 10 uses a single carrier DFT on the signals received by each antenna 12 in order to demodulate the pilot subcarrier, thus eliminating the need for a full FFT to be done on each antenna output. Preferably, the pilot carrier is located at or near the center carrier of the OFDM symbol spectrum and modulated with a constant modulus constellation such as QPSK or DPSK, or simply unmodulated. Note that the pilot carrier 46 can be used to transmit data, so that the carrier usage rate for data transmission will not be reduced or will only be slightly reduced due to using the pilot carrier to train the adaptive antenna array.

Not every OFDM symbol needs be used to train the adaptive antenna array. Preferably, the symbols at the time points according to the update rate $f_{up}=1/T_{up}$ will be used. The update period $T_{up}$ is determined by the following relationship:

$$\frac{\lambda}{4} \leq v_{max}T_{up} \leq \frac{\lambda}{2} \tag{47}$$

Where:

$v_{max}$ is the maximum moving speed of the antenna array; and $\lambda$ is the wavelength of the RF carrier on which the OFDM symbols are modulated.

A larger value for update period $T_{up}$ will result in poor estimation of the parameters (e.g. $\overline{p^2}$ and $\overline{p}$), but a much smaller value of $T_{up}$ is not necessary and it only causes a heavy processing load on the array controller 22.

The algorithm below is similar to the algorithm used for training symbol TRS I or TRS II, but without correlation processing.

$$p=|y(t_{up})|^2 \tag{48}$$

$$\sigma_p^2=\overline{(p-\overline{p})^2}=\overline{p^2}-\overline{p}^2 \tag{12}$$

$$y(t_{up})=W^H X(t_{up}) \tag{49}$$

$$X(t_{up}) = \underset{\omega=\omega_{tr}}{DFT}\{[x_1(t), x_2(t), \ldots, x_M(t)]^T\}, \tag{50}$$

$t \in OFDM$ symbol selected by $t_{up}$ $$t_{up}=nT_{up}=n \cdot mT_{sym}, \, m=[T_{up}/T_{sum}]\geq 1, \, n=0,1,2 \ldots \tag{51}$$

$$p_0 = \frac{sum\{diag[\overline{X(t_{up})X^H(t_{up})}]\}}{M} \tag{52}$$

Where:

$t_{up}$ is the time points when symbols are used for update; and $\omega_{tr}$ refers to the circular frequency of the pilot carrier.

Because of the filtering effect of the DFT performed on the pilot, the output from each DFT contains primarily the signal information in $\overline{p}$ and $\overline{p^2}$, with little or no interference signal information. Therefore the principles of choosing the weight coefficients $\mu_0, \mu_1$ and $\mu_2$ in the cost functions (1), (2) or (3) for training symbol TRS I or TRS II modes I and mode II can be used in selecting the weight coefficients for solving the cost functions in respect of the OFDM training symbols.

In certain transmission environments, it may be desirable to configure the adaptive antenna array 10 to selectively use the OFDM pilot carrier 46 or the preamble training symbols to train the adaptive antenna array depending upon the channel characteristics and/or the speed of the vehicle. For example, although the training symbol TRS II in Mode I and Mode II works if the antenna array is at a standstill or moving at a low speed, if the antenna array moves at higher speeds, some limited phase error may occur in the estimated parameters, such as $\overline{p^2}$ and $\overline{p}$ due to Doppler spreads. If the antenna array is in motion, the OFDM symbols can instead be used to train the adaptive antenna array, especially if the frame 38 has a long duration. In such circumstances, ongoing use of the OFDM symbols can provide virtually continuous training, rather than just during the frame preamble. In order to determine when the antenna array is moving at a speed which justifies use of the OFDM signals, the adaptive antenna array controller 22 is preferably configured to track changes in the Doppler shift occurring in received signals, and switch from using preamble symbols to using the OFDM pilot symbols to train the adaptive array when the change in Doppler shift reaches a predetermined value.

EXAMPLE OF OPERATION

With reference to the Figures, an example of one preferred configuration and method of operation of the adaptive antenna array 10 will now be described. As indicated in FIG. 1, the adaptive antenna array 10 includes M antennas 12. In the present example, M is equal to 4, with the four antennas being arranged in rhombus array form. Based on signals received by the four antennas, the adaptive antenna array controller 22 adaptively determines, during each transmission frame, a complex weight vector $W=[w_1, w_2, \ldots, w_M]^T$ to be applied to the received signals at weighting devices 24 in order to cancel unwanted multipath and other undesired interfering signals.

Figure 6:
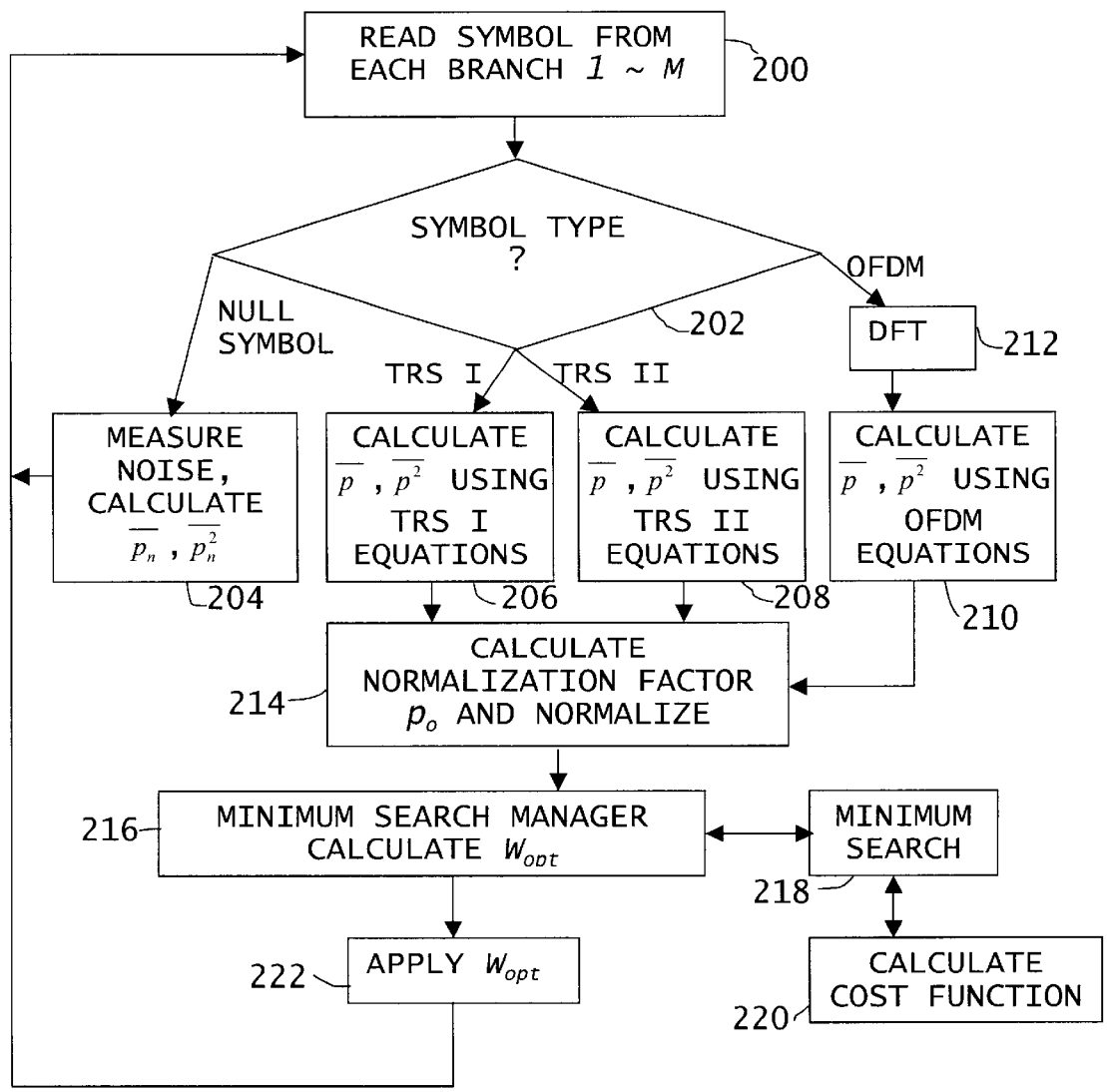
FIG. 6 is a flow chart of a preferred operation of the adaptive antenna array of FIG. 1.

FIG. 6 shows a flow chart of the operation of the adaptive antenna array 10 during operation of the adaptive antenna array 10. Prior to performing the steps shown in FIG. 6, the adaptive antenna array will perform an initialization routine during which the OFDM receiver 30 and PLL controller 32 achieve timing synchronization with the incoming data frames. With reference to block 200, once synchronization has been achieved, the adaptive array controller 22 reads in a symbol from each of the antenna branches 1, 2, ... M. The timing and frequency with which the adaptive array controller 22 reads in symbols depends upon which of the possible processing alternatives suggested above are used by the adaptive antenna array, as the different alternative depend on different symbols (for example, training symbol TRS I; training symbol TRS II, Mode I, Mode II or Mode III; or OFDM symbols). In one preferred embodiment, the adaptive antenna array is configured to adaptively determine what processing alternative is most suited for the current channel conditions, and in this regard performs an adaptive antenna array initialization routine or a endless loop routine during which the adaptive antenna array controller 22 receives the FFT output from the OFDM receiver 30 over a number of transmission frames and determines if interference signals exist, and if so, the strength and bandwidth spread of the interference. During this routine, the adaptive antenna array preferably also determines if and how fast it (or the transmit antenna) is moving by measuring the Doppler shift that occurs in symbols between frames. Based on the measured interference characteristics, antenna speed, and known frame characteristics (for example, frame length and bandwidth) the array controller 22 selects an appropriate processing alternative. For example, in a low interference environment, the adaptive antenna array may elect to use training symbol TRS I and its associated algorithm. In an environment with higher interference noise, the adaptive antenna array may elect to use training symbol TRS II and, depending on the noise and speed characteristics, Mode I (narrowband interference, low or no speed), Mode II (wideband interference, low or no speed) or Mode III (strong wideband interference, low, no or fast speed). In an environment where the transmit or receive antenna is moving at a higher speed, with relatively little interference, the adaptive antenna array may select the pilot OFDM carrier symbols and associated algorithm for steering training purposes. Preferably, the adaptive antenna array continuously tracks its environment on an ongoing basis so that it can change its steering methodology if necessary when the interference characteristics and antenna speed change.

It will be appreciated that if the array antenna is to switch adaptively between the training symbols TRS I and TRS II, than an uplink should be provided to permit the receiver to provide feed back to the transmitter which training symbol TRS I or TRS II should be inserted at symbol slot 44 in the preamble of frame 38. Alternatively, both training symbols TRS I and TRS II could be included in the preamble, however this would reduce throughput.

As indicated in block 202, FIG. 6, after reading in a symbol, the adaptive antenna array controller 22 selects a processing path dependent upon the type of symbol. As per block 204, in the event that the symbol which has been read is a Null Symbol 42, the controller 22 determines the interference noise characteristics based on the FFT output of the OFDM receiver output 30. As indicated above, such noise characteristics are used by the controller 22 to determine the appropriate steering algorithm to employ. Additionally, in the event that the chosen algorithm is that associated with training symbol TRS II, Mode II, the controller 22 determines a mean power of interfering signals ($\overline{p_n}$) during the Null Symbol, as well as a mean of the square of the power of interfering signals ($\overline{p_n^2}$) during the Null Symbol. The calculated values are stored for future calculations, and the controller 22 then reads another symbol (block 200).

If the symbol read during block 200 is a Training Symbol TRS I, a Training Symbol TRS II, or an OFDM symbol, the mean signal power ($\overline{p}$) and the mean of the signal power squared ($\overline{p^2}$) are calculated using the appropriate algorithms (blocks 206,208,210, respectively). As indicated in block 212, in the event that the symbol is an OFDM symbol, the array controller 22 performs, for each antenna branch 1–M, a DFT on the carrier carrying the pilot symbols 46 in order to extract the pilot symbol prior to determining the mean power values. The use of a partial DFT eliminates the need for a full FFT engine for each antenna branch.

The normalization factor $p_o$ is then determined, and normalization carried out (block 208). As indicated in block 216, a minimum search manager function is then performed, and the optimal weight vector $W_{opt}$ calculated. In particular, the minimum search manager function controls search and tracking of multi-minimums of the cost function (blocks 218,220).

In determining the optimum weight vector $W_{opt}$, the array controller 22 takes into account at which point in the transmission frame 38 the weight vector is being calculated. At the start of a frame (in particular, when a Training Symbol TRS I or TRS II appears), the weight vector $W_{opt}$ which is calculated will correspond to the main minimum. However, during the rest of the frame (while OFDM pilot symbols are received), the weight vector $W_{opt}$ will preferably only be updated by tracking changes in the minimum selected during the Training Symbol TRS I or TRS II. As a result, no jumps from one local minimum to a different lower local minimum will occur during a single frame 38. Rather, such jumps will occur only when transmission of a new frame 38 occurs in order that a steady channel property will be maintained.

Once the weight vector $W_{opt}$ has been calculated, the array controller 22 causes it to be applied to the incoming signal at complex weighting devices 24 (block 222). The controller 22 then returns to block 200 to read another symbol and repeat the process described above.

Although the process described in respect of FIG. 6 illustrates an embodiment in which the adaptive antenna array is configured to adaptively select between a number of different possible training signals and processing modes, the array antenna could alternatively be configured to permit fewer, or only one, steering options. For example, the array antenna could be pre configured only to use training symbol TRS I, or TRS II, or the OFDM pilot carrier symbols. In such case, the preconfiguration would preferably be selected to provide suitable operation in the anticipated operating environment of the adaptive antenna array. Generally in an unknown operating environment, the training symbol TRSII would be the preferred training symbol, along with a pilot carrier in the OFDM symbols.

It will be appreciated that the algorithms disclosed herein do not require any explicit knowledge of the array geometry, nor any array calibration. It will also be appreciated that training symbols TRS I and TRS II and their corresponding algorithms could also be used to train adaptive antenna arrays in non OFDM systems.

Although various embodiments are specifically illustrated and described herein, it will be appreciated that modifications and variations of the present invention are covered by the above teachings and within the purview of the appended claims without departing from the spirit and intended scope of the invention.

I claim:

1. A method for combining a plurality of antenna output signals, each antenna output signal being received from one of a plurality of branches fed from a corresponding plurality of antennas, each radio signal comprising a frame including a pseudo random training symbol and at least one data symbol, the method comprising:

(a) determining a weighting factor for each branch based on power characteristics of the pseudo random training symbol; and (b) combining the antenna output signals from each branch in accordance with the determined weighting factors to form a combined signal.

2. The method of claim 1 wherein the data symbol is a multicarrier modulated symbol.

3. The method of claim 1 wherein the data symbol is an Orthogonal Frequency Division Modulated (OFDM) symbol.

4. The method of claim 1 wherein the weighting factor for each branch is determined from an average power and power variance determined from the pseudo random training symbol.

5. The method of claim 1 wherein the weighting factors are determined by selecting from a plurality of possible values the weighting factors which, based on a predetermined cost factor, result in an optimal combination of high average power and low power variance determined from the pseudo random training symbol.

6. The method of claim 1 wherein the training symbol includes a useful signal portion and a cyclic guard portion that is a replica of part of the useful signal portion, the method further including a step of separating training symbol information from interfering noise information based on autocorrelation properties of the training symbol.

7. The method of claim 1 wherein the radio signals occupy a pre-assigned bandwidth and the pseudo random training symbol has a bandwidth that is close to, but less than, the preassigned bandwidth.

8. A radio frequency receiver including an antenna array device for combining signals received by a plurality of antennas in a communications system where the antennas receive data signals that include a pseudo random training symbol and at least one data symbol, the antenna array device comprising:

(a) an array controller, arranged to receive the data signals from each of the antennas, for determining a weighting factor for each antenna based on power characteristics of the pseudo random training symbol;

(b) a weighting device coupled to each antenna for weighting the data signal received by each antenna according to the weight factor determined for each antenna; and (c) a combiner for receiving and combining the weighted data signals to form a combined data signal.

9. The antenna array device of claim 8 wherein the array controller determines the weighting factor for each antenna based on an average power and power variance determined from the pseudo random training symbol.

10. The antenna array device of claim 8 wherein the weighting factors are determined by selecting from a plurality of possible values the weighting factors which, based on a predetermined cost factor, result in an optimal combination of high average power and low power variance determined from the pseudo random training symbol.

11. The antenna array device of claim 8 wherein the data symbol includes a plurality of subsymbols each modulated on a separate subcarrier.

12. The antenna array device of claim 8 wherein the data symbol is an OFDM symbol.

13. The antenna array device of claim 8 wherein the pseudo random training symbol includes a first pseudo random subsymbol and a second subsymbol that is substantially identical to the first subsymbol, the array controller being configured to separate training symbol information from interfering noise signal information based on autocorrelation properties of the training symbol.

14. The antenna array device of claim 8 wherein the data signals occupy a preassigned bandwidth and the pseudo random training symbol has a bandwidth that is close to, but less than, the preassigned bandwidth.

15. A method for steering an adaptive antenna array that includes a plurality of antennas in a communications system where the antennas receive and output data signals that include a training symbol and at least one data symbol, the training symbol including a first pseudo random subsymbol and a second subsymbol that substantially identical to the first subsymbol, the method comprising:

(a) separating training symbol information from interfering noise signal information based on autocorrelation properties of the training symbol;

(b) determining a weighting factor for the signals received by each antenna, the weighting factor being determined from power characteristics of the separated training signal information; and (c) combining the signals from each antenna in accordance with the determined weighting factors to form a combined signal.

16. The method of claim 15 wherein the weighting factor for the signals received by each antenna are based on an average power and power variance determined from the separated training symbol information.

17. The method of claim 15 wherein the output data signals include a null symbol, the method including a step of measuring interfering signal characteristics during the null symbol and, based on the interfering signal characteristics, selecting which of a plurality of predetermined algorithms to use to determine the weighting factor for signals received by each antenna.

18. The method of claim 15 wherein the output data signals include a null symbol, the method including a step of measuring interfering signal characteristics during the null symbol, the weighting factor in step (b) being determined from power characteristics of the separated training signal information and the measured interfering signal characteristics.

19. The method of claim 18 wherein the weighting factors are determined by selecting from a plurality of possible values the weighting factors which, based on a predetermined cost factor, result in an optimal combination of low average power during the null symbol and high average power and low power variance as determined from the pseudo random training symbol.

20. The method of claim 15 wherein the data symbol is an OFDM symbol.

21. A method for combining a plurality of antenna output signals, each antenna output signal being received from one of a plurality of branches fed from a corresponding plurality of antennas, each radio signal comprising a plurality of OFDM symbols including a constant modulus pilot carrier, the method including:

(a) determining a weighting factor for each branch, the weighting factor being determined from power characteristics of the constant modulus pilot carrier; and (b) combining the antenna output signals from each branch in accordance with the determined weighting factors to form a combined signal.

22. The method of claim 21 wherein the weighting factor for each branch is determined from an average power and power variance determined from the constant modulus pilot carrier.

23. The method of claim 21 wherein the weighting factors are determined by selecting from a plurality of possible values the weighting factors which, based on a predetermined cost factor, result in an optimal combination of high average power and low power variance determined from the constant modulus pilot carrier.

24. The method of claim 21 wherein the output data signals include a null symbol, the method including a step of measuring interfering signal characteristics during the null symbol, the weighting factor in step (a) being determined from power characteristics of the constant modulus pilot carrier and the measured interfering signal characteristics.

25. The method of claim 24 wherein the weighting factors are determined by selecting from a plurality of possible values the weighting factors which, based on a predetermined cost factor, result in an optimal combination of high average power and low power variance determined from the constant modulus pilot carrier and low average power of the null symbol.

* * * * *